(12) United States Patent
Ivrii et al.

(10) Patent No.: US 10,540,469 B2
(45) Date of Patent: Jan. 21, 2020

(54) VERIFYING SEQUENTIAL EQUIVALENCE FOR RANDOMLY INITIALIZED DESIGNS

(71) Applicant: International Business Machines Corporation, Armonk, NY (US)

(72) Inventors: Alexander Ivrii, Haifa (IL); Haim Kermany, Manof (IL); Ziv Nevo, Yokneam Ilit (IL)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 15/844,668

(22) Filed: Dec. 18, 2017

(65) Prior Publication Data

US 2019/0188349 A1 Jun. 20, 2019

(51) Int. Cl.
*G06F 17/50* (2006.01)

(52) U.S. Cl.
CPC ...... *G06F 17/5054* (2013.01); *G06F 17/5018* (2013.01); *G06F 17/5031* (2013.01); *G06F 17/5081* (2013.01); *G06F 2217/62* (2013.01); *G06F 2217/84* (2013.01)

(58) Field of Classification Search
CPC ............. G06F 17/5018; G06F 17/5031; G06F 17/5054
USPC .................................................. 716/106, 107
See application file for complete search history.

(56) References Cited

U.S. PATENT DOCUMENTS

| | | | | |
|---|---|---|---|---|
| 6,035,109 | A | * | 3/2000 | Ashar et al. .......... G06F 17/504 716/104 |
| 6,691,286 | B1 | * | 2/2004 | McElvain et al. ... G06F 17/5022 702/109 |
| 7,032,192 | B2 | * | 4/2006 | Prasad et al. ......... G06F 17/504 716/103 |
| 7,149,675 | B2 | | 12/2006 | Hoskote et al. |
| 8,407,639 | B2 | | 3/2013 | Redekopp |
| 8,666,723 | B2 | * | 3/2014 | Xie et al. ................ G06F 9/455 703/13 |
| 9,529,947 | B1 | | 12/2016 | Chiu |

(Continued)

OTHER PUBLICATIONS

Mneimneh et al.,"Principles of Sequential-Equivalence Verification", May 2005, IEEE Design & Test of Computers, pp. 248-257.*

(Continued)

*Primary Examiner* — Sun J Lin
(74) *Attorney, Agent, or Firm* — Dvir Gassner (57) ABSTRACT

A computerized method for mapping of electronic designs comprising using at least one hardware processor for receiving a first hardware design model and a second hardware design model, each hardware design model configured to receive a startup state and send digital output values. Hardware processor(s) are used for generating a plurality of initial states. Hardware processor(s) are used for computing, using each one of the first and second hardware design models, at least one specific output value for each one of the plurality of initial states. Hardware processor(s) are used for selecting corresponding initial states that produce equivalent at least one specific output value between the first hardware design model and the second hardware design model. Hardware processor(s) are used for storing the selected corresponding initial states as mappings between the first hardware design model and the second hardware design model.

19 Claims, 4 Drawing Sheets

(56) References Cited

U.S. PATENT DOCUMENTS

| | | | |
|---|---|---|---|
| 2004/0153983 A1* | 8/2004 | McMillan | G06F 17/504 |
| | | | 716/106 |
| 2004/0237057 A1* | 11/2004 | Prasad et al. | G06F 17/504 |
| | | | 716/103 |
| 2007/0220461 A1 | 9/2007 | Baumgartner et al. | |

OTHER PUBLICATIONS

Nguyen,"Sequential Equivalence Checking with Efficient Filtering Strategies for Inductive Invariants", Apr. 2011, Virginia Polytechnic Institute and State University, master thesis (one set).*

Eijk, "Sequential Equivalence Checking without State Space Traversal", Proceedings Design, Automation and Test in Europe, 1998, pp. 618-623.

Baumgartner et al., "Scalable Sequential Equivalence Checking across Arbitrary Design Transformations", 2006 International Conference on Computer Design, 2006, pp. 259-266.

Pixley, "A Theory and Implementation of Sequential Hardware Equivalence", IEEE Transactions on Computer-Aided Design of Integrated Circuits and Systems, Dec. 1992, vol. 11, Issue 12, pp. 1469-1478.

Singhal et al., "Theory of Safe Replacements for Sequential Circuits", IEEE Transactions on Computer-Aided Design of Integrated Circuits and Systems, Feb. 2001, vol. 20, Issue 2, pp. 249-265.

Khasidashvili et al., "SAT-Based Methods for Sequential Hardware Equivalence Verification without Synchronization", Electronic Notes in Theoretical Computer Science, 2003, vol. 89, Issue 4, pp. 593-607.

* cited by examiner

OLD design

FIG. 3A

NEW design

VERIFYING SEQUENTIAL EQUIVALENCE FOR RANDOMLY INITIALIZED DESIGNS

BACKGROUND

The invention relates to the field of electronic design automation (EDA).

Sequential equivalence checking (SEC) may refer to verifying that the outputs of two hardware designs behave equivalently for any inputs sequence. In practice, SEC may be used to efficiently prove correctness of sequential design transformations, such as retiming, finite-state machine (FSM) re-encoding, addition of clock-gating logic, and/or the like.

Over the years, several different methodologies for SEC have been adopted, such as showing equivalence of two designs with respect to a specified initial state, such as the power-on reset state. This technique has attracted a lot of research and highly scalable algorithms are known.

Another example methodology considers completely random initial states. In this case, it is customary to perform an alignability analysis, that is, to look for a reset sequence that brings the random initial state to a deterministic synchronization state after which the designs behave equivalently. If a correct reset sequence is known, then the problem reduces to the previous one.

In general, alignability analysis is significantly less scalable and has several pitfalls. First, there is a risk of false negatives—comparing the design to itself could fail if the reset sequence does not exist. Second, there is a risk of false positives—for example, an automatically computed reset sequence may put a design into a deadlock state, and in this way two very different designs may behave identically. Another possibility is for the designer to specify a mapping file, correlating the initial values of the two designs.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a computerized method for mapping of electronic designs comprising using at least one hardware processor for receiving a first hardware design model and a second hardware design model, each hardware design model configured to receive a startup state and send digital output values. Hardware processor(s) are used for generating a plurality of initial states. Hardware processor(s) are used for computing, using each of the first and second hardware design models, at least one specific output value for each of the plurality of initial states. Hardware processor(s) are used for selecting the corresponding initial states that produce equivalent at least one specific output value between the first hardware design model and the second hardware design model. Hardware processor(s) are used for storing the selected corresponding initial states as mappings between the first hardware design model and the second hardware design model.

There is provided, in accordance with an embodiment, a computer program product, the computer program product comprising a non-transitory computer-readable storage medium having program code embodied therewith. The program code is executable by at least one hardware processor to receive a first hardware design model and a second hardware design model, each hardware design model configured to receive a startup state and send digital output values. The program code is executable by at least one hardware processor to generate a plurality of initial states. The program code is executable by at least one hardware processor to compute, using each of the first and second hardware design models, at least one specific output value for each of the plurality of initial states. The program code is executable by at least one hardware processor to select the corresponding initial states that produce equivalent at least one specific output value between the first hardware design model and the second hardware design model. The program code is executable by at least one hardware processor to store the selected corresponding initial states as mappings between the first hardware design model and the second hardware design model.

There is provided, in accordance with an embodiment, a computerized system comprising at least one hardware processor, and a non-transitory computer-readable storage medium having program code embodied therewith. The program code executable by at least one hardware processor to receive a first hardware design model and a second hardware design model, each hardware design model configured to receive a startup state and send digital output values. The program code executable by at least one hardware processor to generate a plurality of initial states. The program code executable by at least one hardware processor to compute, using each of the first and second hardware design models, at least one specific output value for each of the plurality of initial states. The program code executable by at least one hardware processor to select the corresponding initial states that produce equivalent at least one specific output value between the first hardware design model and the second hardware design model. The program code executable by at least one hardware processor to store the selected corresponding initial states as mappings between the first hardware design model and the second hardware design model.

According to some embodiments, the generating a plurality of initial states comprises verification initial states used for verification of first hardware design.

According to some embodiments, the mappings comprise at least one mapping of a counter-example of initial states from the first hardware design to the second hardware design.

According to some embodiments, the mappings comprise at least one counter-example mapping defining a counter-example of initial states from the second hardware design to the first hardware design.

According to some embodiments, the mappings comprise at least one manual mapping, set by a manual operation of a user, wherein each of the at least one manual mapping is a mapping between the first and second hardware designs.

According to some embodiments, the at least one manual mapping was determined by an additional verification test results for the second hardware design.

According to some embodiments, the selecting is performed automatically by at least one of a Quantified Boolean Formula solver and a Boolean satisfiability problem solver.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein are aspects and embodiments for sequential equivalence checking between two hardware designs, using an automated mapping constructor. As used herein, "hardware design" means a physical design comprising both hardware and software in different proportions, either or both specifically configured to perform the technical enhancements described herein. More specifically, disclosed are technical enhancements of automatically determining the existence of one or more mappings, determining the mapping(s) details, and other aspects and/or embodiments, that provide technical solutions to the problems of automatically determining mappings for verification between two hardware designs. Mappings herein are determined automatically by randomly generating initial states, and determining the correspondence between inputs and outputs from each hardware design. Solvers are used with the randomly generated initial states, to produce functions that explicitly define the mappings. The mappings may be stored for future verification between the two hardware designs, thus providing a specific technical solution for automating a process that was manually performed previously.

For example, sequential equivalence is performed with respect to random initial states, but neither a reset sequence and/or a mapping file are known. For example, sequential equivalence is performed as part of the RuleBase SixthSense formal verification tool, provided by International Business Machines Corp., Armonk, N.Y. The users may not want others to know of the reset sequence and/or the mapping file.

As used herein, sequential equivalence for two randomly initialized designs (further referred to as OLD and NEW) means the following are true:
(1) there exists a mapping that provides for any initial value of OLD an initial value(s) of NEW, so that the designs become output-equivalent;
(2) there exists a mapping that provides for any initial value of NEW an initial value(s) of OLD, so that the designs become output-equivalent.

Note that the mapping in (1) implies that all the output-behaviors in NEW are also present in OLD, and the mapping in (2) implies that all output-behaviors in OLD are present in NEW. Thus, if both mappings (1) and (2) exist, the designs are considered sequentially equivalent. The mappings (1) and (2) may not be unique.

Aspects of embodiments are configured to automatically check the existence of a mapping from the initial values of OLD to the initial values of NEW, and/or to show that such a mapping may not exist based on the previous verification of the product. Similarly, the same technique may be used to check the existence of a mapping from the initial values of NEW to the initial values of OLD, and/or to show that such a mapping does not exist.

When the mapping from OLD to NEW exists, the disclosed technique automatically constructs a possible mapping. In addition, the technique attempts to find a simple representation of such a mapping when such a mapping exists. Respectively for the mapping from NEW to OLD.

When the mapping from OLD to NEW does not exist, the disclosed techniques may produce a concrete initial state in NEW that cannot map to any of the states in OLD. And respectively for the mapping from NEW to OLD.

The techniques may be adjusted to extend user-defined partial mappings between initial states.

Applications of the techniques may allow verification resource reuse, such as with a second-generation (and onward) integrated circuit (IC) product for example. In this example, verification of the new IC is performed by mapping initial states and outputs, and reusing verification tests from the old IC when the mapping allows. For example, a mapping of initial states may make the previous verification results applicable to the updated IC design. This may save both time and resources of a full verification testing of the update and may allow streamlining the IC update roll-out.

Other techniques show that when mappings between initial states are provided externally, then synthesizing the logic that shows states that initialize the two designs according to this mapping, and verification may be streamlined. Other techniques may not determine such a mapping or prove that none exists as in the current disclosure. Some techniques structurally analyze the designs to build a mapping of state elements from one design to the other. The techniques may not address the question of initialization at all. Some techniques deal with designs transformed by retiming and not by general transformation as in the current disclosure. In addition, other techniques require that the transformation stores information (incl. initial values) to assist the sequential equivalence process. These problems and others are solved by the techniques disclosed herein, to technically compute information on the mapping, possibly enough to reuse verification resources more efficiently, and improve time to implement updates.

Figure 1:
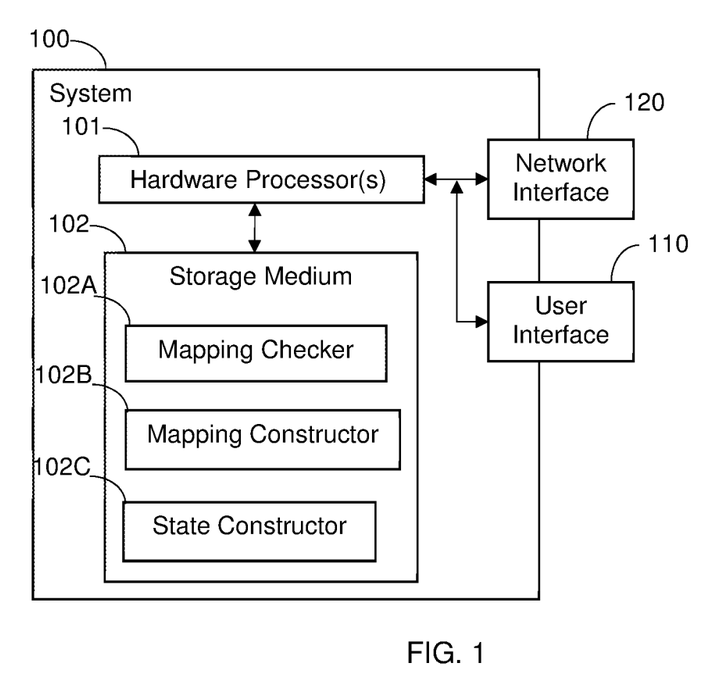
FIG. 1 shows schematically a system for sequential equivalence checking using a mapping constructor.
Figure 2:
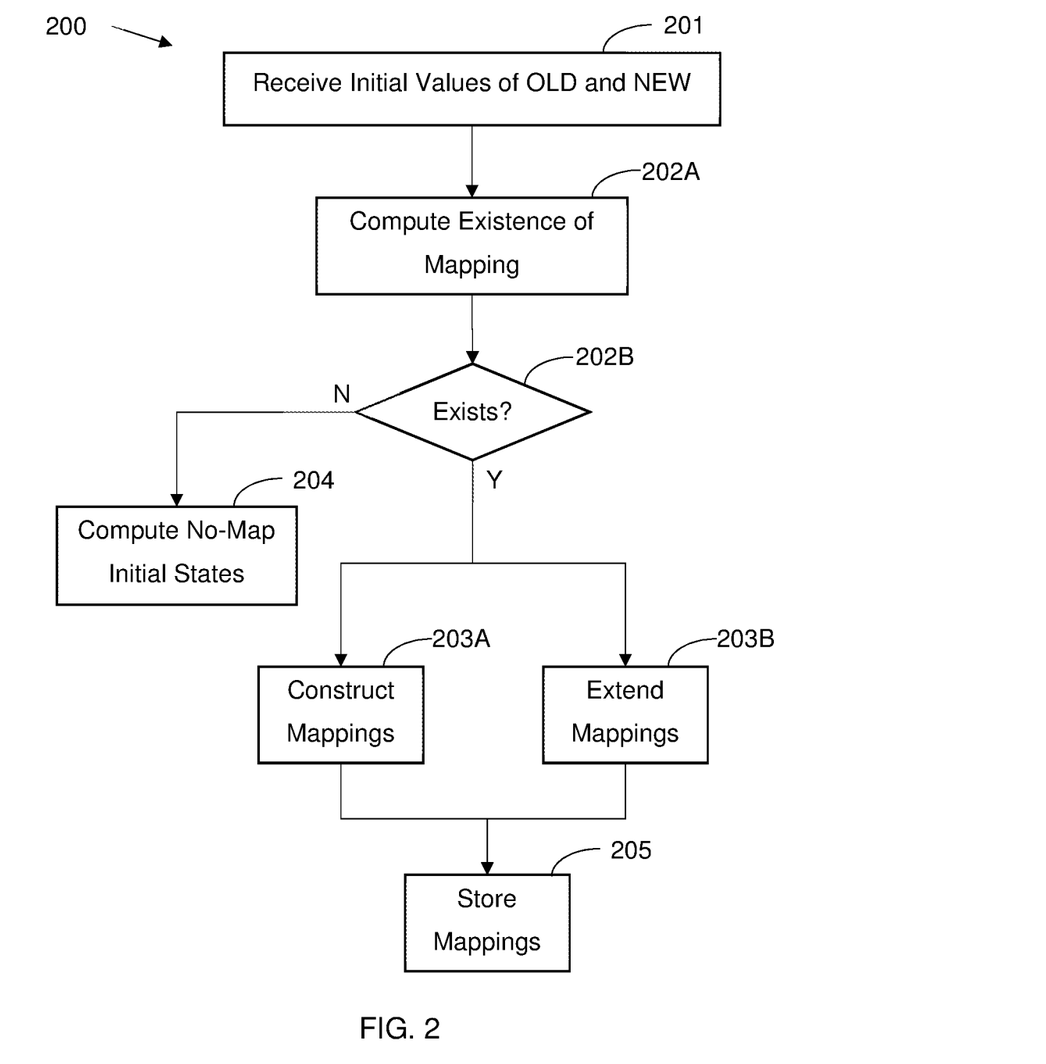
FIG. 2 shows a flowchart of a method for sequential equivalence checking using a mapping constructor.

Reference is now made to FIG. 1 and FIG. 2, which show respectively schematically a system 100 and a flowchart of a method 200 for sequential equivalence checking using a mapping constructor. System 100 comprises one or more hardware processors 101, a network data interface 120, a user interface110, and a non-transitory computer-readable storage medium 102. Storage medium 102 has encoded thereon program code, the code comprising processor instructions for the hardware processor(s). The code is configured with a Mapping Checker 102A, for receiving 201 initial values of two designs, denoted OLD and NEW. Mapping Checker 102A is further configured compute 202A and determine 202B the existence mapping between OLD and NEW states. When mapping do not exist, no-mapping initial states may be computed 204. When mappings exist, they may be constructed 203A and/or extended 203B. The mappings may be stored 205 and/or used to support reuse of verification results from previous designs.

A simple example of aspects of embodiments, may demonstrate techniques disclosed herein.

Figure 3A:
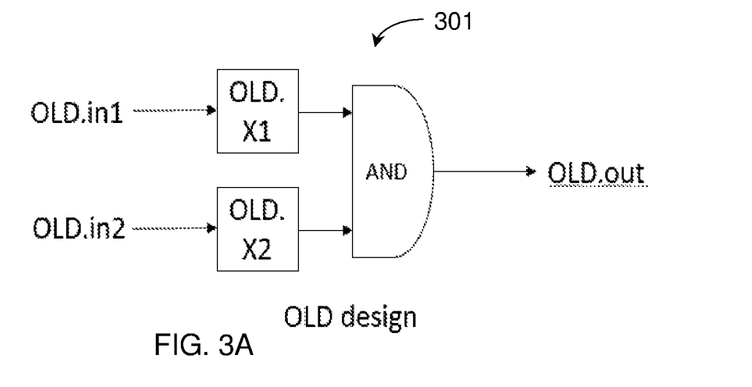
FIG. 3A shows schematically an OLD hardware design for sequential equivalence checking.
Figure 3B:
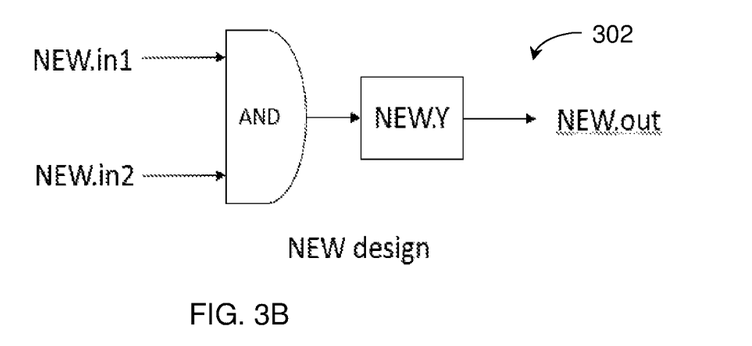
FIG. 3B shows schematically a NEW hardware design for sequential equivalence checking.

Reference is now made to FIG. 3A and FIG. 3B, which shows schematically a comparison of OLD and NEW hardware designs for sequential equivalence checking. In FIG. 3A and FIG. 3B a simple design is shown before (OLD, 301) and after (NEW, 302) an update to the logic circuits, such as for retiming, etc.

OLD design 301 contains two state elements (flip-flops/registers/latches) OLD.X1 and OLD.X2, two free inputs OLD.in1 and OLD.in2, and one output OLD.out.

NEW design 302 contains a single state element NEW.Y, two free inputs NEW.in1 and NEW.in2, and one output NEW.out. NEW 302 may be considered a retiming of OLD 301.

First consider that sequential verification comprises that whenever the inputs of OLD and NEW correspond (that is for every timeframe OLD.in1=NEW.in1 and OLD.in2=NEW.in2) the outputs also correspond (that is, whether OLD.out=NEW.out). When the sequential equivalence is performed with respect to all-0 initial states for OLD and NEW (that is, initially OLD.X1=OLD.X2=0 and NEW.X1=NEW.X2=0), then on every timeframe OLD.out and NEW.out are indeed equal. However, when the sequential equivalence is performed with respect to random initial states for both OLD and NEW, then the two designs are no longer output-equivalent. Indeed, if initially OLD.X1=OLD.X2=1, but NEW.Y=0, then OLD.out=1 while NEW.out=0 in timeframe 0.

When there exist mappings, the two designs are sequentially equivalent. The mapping from OLD to NEW can be defined as init(NEW.Y)=init(OLD.X1) & init(OLD.X2). The mapping from NEW to OLD can be constructed as init(OLD.X1)=init(NEW.Y), init(OLD.X2)=init(NEW.Y). This mapping is not unique, another possible mapping is init(OLD.X1)=init(NEW.Y), init(OLD.X2)=1.

Following are further descriptions of the algorithmic contributions in this invention.

Following are descriptions of aspects of some embodiments for enabling reuse of verification tests during development, such as integrated circuit (IC) development, hardware development, electronic development, processor instructions development, and/or the like. For example, following is a disclosure of a technique for automatically checking for the existence of a mapping from the initial values of OLD to the initial values of NEW, or to show that such a mapping does not exist.

Optionally, an algorithm (ALGORITHM 1) automatically checks the existence of a mapping from the initial values of OLD to the initial values of NEW, or to show that such a mapping does not exist, by configuring hardware processor(s) to:

ALGORITHM 1:
1. Combine the two designs (OLD and NEW) into a single combined design.
2. Find all initial states in the combined design for which OLD.out is not equivalent to NEW.out. Let S(X, Y) be the logical disjunction of these initial states.
3. Let F(X, Y)=!S(X, Y).
4. Use a Quantified Boolean Formula (QBF)-solver for the formula $\forall X \exists Y\ F(X,Y)$. For example, for each X there exists Y that makes F(X,Y) true.

Figure 4:
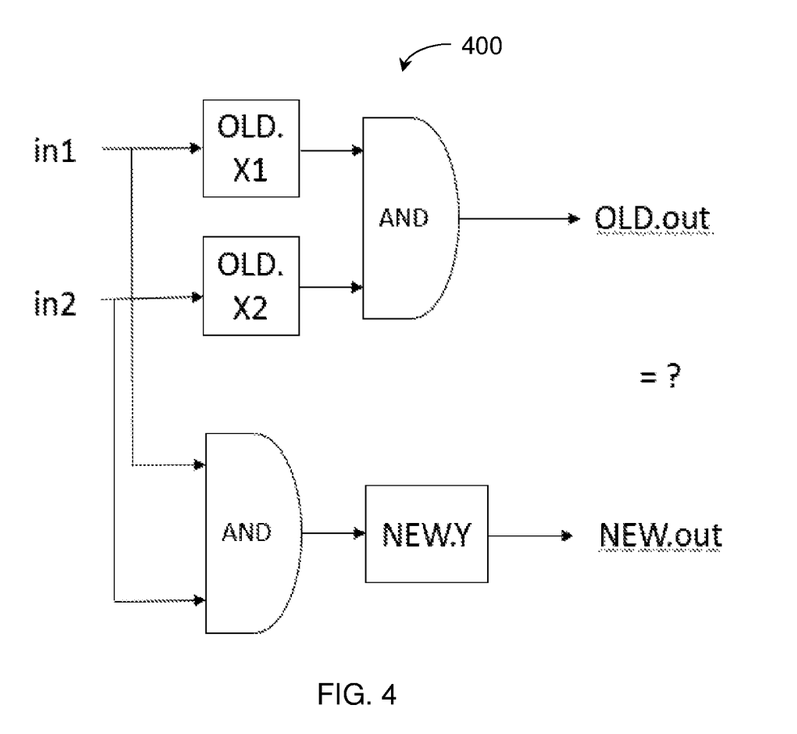
FIG. 4 shows schematically a combined logic design for sequential equivalence checking.

Reference is now made to FIG. 4, which shows schematically a combined logic design 400 for sequential equivalence checking. The two designs OLD and NEW are combined in ALGORITHM 1, by joining the corresponding inputs of OLD and NEW. The state variables of the combined design comprise the state variables of OLD and the state variables of NEW.

In the second step, ALGORITHM 1 enumerates all assignments to the initial values of the combined design that may lead to a mismatch between OLD.out and NEW.out in any number of timesteps. In practice this step may be implemented by iteratively running a model checker on the combined design 400 with a safety target denoted T=(OLD.out !=NEW.out). Each time that the model checker returns a counterexample trace, its initial state (representing an assignment to X and Y) is extracted and added to S. This assignment is then blocked for further runs via an additional constraint. For efficiency reasons, it is crucial to first generalize the counterexample trace, that is find a large set of states all of which lead to a violation of T.

In the third step, ALGORITHM 1 generates the set F(X, Y), which is the negation of the set S(X, Y) computed in step 2. The set F(X, Y) represents the set of constraints on the initial states of the two designs after which the designs are expected to be output-equivalent. The problem now reduces to checking whether there is a function (i.e. an analytical formula, a look-up-table mapping, and/or the like) from OLD to NEW that satisfies all these constraints. For example, for every assignment to X there is some assignment to Y such that all the constraints in F(X, Y) hold. For example, a QBF-solver finds the assignments.

The drawback of ALGORITHM 1 may be when steps 2 and 3 are computationally expensive. However, ALGORITHM 1 efficiency may be improved when the differences between OLD and NEW are localized.

Following is a description of automatically constructing a mapping, when the mapping from OLD to NEW exists.

When the formula $\forall X \exists Y\ F(X,Y)$ holds, modern QBF-solvers may produce a Skolem function for Y (such as an analytical function), that is a function of Y=h(X) so that F(X, h(X)) becomes a tautology. Thus, a Skolem function may explicitly define the mapping from the initial states of OLD to the initial states of NEW that satisfies all the constraints F(X,Y).

A drawback of the above is that mapping functions produces by a QBF-solver may be unnecessarily complicated. Following is an algorithm of two steps that may replace the QBF-based approach in step 4 of Algorithm 1 by a Boolean Satisfiability Problem (SAT)—based approach and to find a simple mapping function.

ALGORITHM 1—Looking for simple definitions of NEW out of OLD:
1. Let $Y=\{y_1, \ldots, y_m\}$. For each state variable $y_i$ in Y let $h_i$ be multiplexer MUX(0, 1, $x_1, \ldots, x_n, -x_1, \ldots, -x_n$). That is, depending on the value of the multiplexer input, $h_i$ can equal either to a constant (0 or 1), or one of the X-variables or its negation.
2. Perform the SAT query $F(x_1, \ldots, x_n, h_1, \ldots, h_m)$. If the SAT query is satisfiable, values to corresponding multiplexer inputs represent specific functions defining y-variables from $x_1, \ldots, x_n$.

The two main benefits of ALGORITHM 2 are that it may employ a SAT solver rather than a QBF-solver, and thus may be more scalable. In addition, when ALGORITHM 2 succeeds, the Skolem and/or mapping functions are simple (either constants or X-variables or negations of X-variables).

The drawback of ALGORITHM 2 is that such simple functions may not always exist. One possibility can be to rerun ALGORITHM 2 with a larger set of template functions (for example, also including pairwise-ANDs and pairwise-ORs of the x-variables). A practical possibility could be to run ALGORITHM 2 with several simple templates, and if unsuccessful then to switch to a full QBF-approach.

Following is a description of produce a concrete initial state in NEW that cannot map to any of the states in OLD, when the mapping from OLD to NEW does not exist, and/or respectively when the mapping from NEW to OLD does not exist.

When the formula $\forall X \, \exists Y \, F(X,Y)$ does not hold, it means that there is a value x for X for which no value y makes $F(x,y)$ satisfiable. Modern QBF-solvers may produce such examples. In practice, x represents a concrete initial state in the OLD design for which there is no matching initial state in the new design. Such a state may provide evidence for sequentially non-equivalence between OLD and NEW.

Following is a description of extending some user-defined partial mappings between initial states to the found mappings when determining any of the matching or counterexample initial states.

A user may wish to specify additional constraints on the mappings from OLD to NEW and vice versa. A typical use-case may be that certain clocks should be initialized with 0 rather than to a random value. Another use-case may be to provide mappings between some of the initial states. This information may be readily incorporated in ALGORITHM 1 and ALGORITHM 2. In step 2 of ALGORITHM 1, the user-specified constraints may be added before enumerating all non-equivalent pairs. These constraints to $F(X,Y)$ may be added in step 3. Additionally, these partial mappings may be used for explanations produced by ALGORITHM 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computerized method for mapping of electronic designs, the method comprising using at least one hardware processor for:
    receiving a first hardware design model and a second hardware design model, each hardware design model configured to receive a startup state and send digital output values; and
    automatically determining mappings between the first hardware design model and the second hardware design mode, by:
        (a) randomly generating a plurality of initial states for each of the first hardware design model and the second hardware design model;
        (b) computing, using each one of the first hardware design model and the second hardware design model, at least one specific output value for each one of the plurality of initial states;
        (c) selecting corresponding initial states that produce equivalent at least one specific output value between the first hardware design model and the second hardware design model, wherein the selecting is performed by at least one of a Quantified Boolean Formula solver and a Boolean satisfiability problem solver, wherein the selected corresponding initial states are the mappings between the first hardware design model and the second hardware design model.

2. The method according to claim 1, wherein the generating of the plurality of initial states comprises verification initial states used for verification of the first hardware design model.

3. The method according to claim 1, wherein the mappings comprise at least one mapping of a counter-example of initial states from the first hardware design model to the second hardware design model.

4. The method according to claim 1, wherein the mappings comprise at least one counter-example mapping defining a counter-example of initial states from the second hardware design model to the first hardware design model.

5. The method according to claim 1, further comprising using the at least one hardware processor for receiving at least one manual mapping, set by a manual operation of a user, wherein each one of the at least one manual mapping is a mapping between the first hardware design model and the second hardware design model.

6. The method according to claim 5, wherein the at least one manual mapping was determined by an additional verification test result for the second hardware design model.

7. The method according to claim 1, wherein:
    the computing comprises combining the first hardware design model and the second hardware design model into a combined design model;
    the selecting by the Quantified Boolean Formula solver comprises:
        (a) finding all initial states, in the combined design model, for which the at least one specific output value of the first hardware design model is not equivalent to the at least one specific output value of the second hardware design model,
        (b) defining a set $S(X,Y)$ as a logical disjunction of the found initial states, wherein X is the found initial states of the first hardware design model, and Y is the found initial states of the second hardware design model,
        (c) generating a set $F(X,Y)$ which is a negation of the set $S(X,Y)$, wherein the set $F(X,Y)$ represents a set of constraints on the plurality of initial states of the first hardware design model and the second hardware design model, wherein, after the constraints are applied, the first hardware design model and the second hardware design model are expected to be output-equivalent,
        (d) solving, with the Quantified Boolean Formula solver, the following formula: for each X there exists Y that makes $F(X,Y)$ true,
        wherein the solving produces Skolem functions defining the mappings between the first hardware design model and the second hardware design model.

8. The method according to claim 1, wherein:
    the computing comprises combining the first hardware design model and the second hardware design model into a combined design model;
    the selecting by the Boolean satisfiability problem solver comprises:
        (a) finding all initial states, in the combined design model, for which the at least one specific output value of the first hardware design model is not equivalent to the at least one specific output value of the second hardware design model,
        (b) defining a set $S(X,Y)$ as a logical disjunction of the found initial states, wherein X is the found initial states of the first hardware design model, and Y is the found initial states of the second hardware design model,
        (c) generating a set $F(X,Y)$ which is a negation of the set $S(X,Y)$, wherein the set $F(X,Y)$ represents a set of constraints on the plurality of initial states of the first hardware design model and the second hardware design model, wherein, after the constraints are applied, the first hardware design model and the second hardware design model are expected to be output-equivalent, (d) defining a multiplexer which, for each of the found initial states in Y that is input into the multiplexer, the multiplexer outputs either: a constant, one of the found initial states in X, or a negation of one of the found initial states in X, (e) checking, with the Boolean satisfiability problem solver, if the following query is satisfiable: F(all initial states in X, and all the multiplexer outputs for Y), wherein, if the query is satisfiable, the multiplexer provides the mappings between the first hardware design model and the second hardware design model.

9. A computer program product, the computer program product comprising a non-transitory computer-readable storage medium having program code embodied therewith, the program code executable by at least one hardware processor to execute actions comprising:

receiving a first hardware design model and a second hardware design model, each hardware design model configured to receive a startup state and send digital output values; and automatically determining mappings between the first hardware design model and the second hardware design model, by:

(a) randomly generating a plurality of initial states;

(b) computing, using each one of the first hardware design model and the second hardware design model, at least one specific output value for each one of the plurality of initial states;

(c) selecting corresponding initial states that produce equivalent at least one specific output value between the first hardware design model and the second hardware design model, wherein the selecting is performed by at least one of a Quantified Boolean Formula solver and a Boolean satisfiability problem solver, wherein the selected corresponding initial states are the mappings between the first hardware design model and the second hardware design model.

10. The computer program product according to claim 9, wherein the generating of the plurality of initial states comprises verification initial states used for verification of the first hardware design model.

11. The computer program product according to claim 9, wherein the mappings comprise at least one mapping of a counter-example of initial states from the first hardware design model to the second hardware design model.

12. The computer program product according to claim 9, wherein the mappings comprise at least one counter-example mapping defining a counter-example of initial states from the second hardware design model to the first hardware design model.

13. The computer program product according to claim 9, wherein the executed actions further comprise receiving at least one manual mapping, set by a manual operation of a user, wherein each one of the at least one manual mapping is a mapping between the first hardware design model and the second hardware design model.

14. The computer program product according to claim 13, wherein the at least one manual mapping was determined by an additional verification test result for the second hardware design model.

15. A computerized system comprising:

at least one hardware processor; and a non-transitory computer-readable storage medium having program code embodied therewith, the program code executable by at least one hardware processor to execute actions comprising:

receiving a first hardware design model and a second hardware design model, each hardware design model configured to receive a startup state and send digital output values; and automatically determining mappings between the first hardware design model and the second hardware design model, by:

(a) randomly generating a plurality of initial states;

(b) computing, using each one of the first hardware design model and the second hardware design model, at last one specific output value for each one of the plurality of initial states;

(c) selecting corresponding initial states that produce equivalent at least one specific output value between the first hardware design model and the second hardware design model, wherein the selecting is performed by at least one of the Quantified Boolean Formula solver and a Boolean satisfiability problem solver, wherein the selected corresponding initial states as mappings between the first hardware design model and the second hardware design model.

16. The computerized system according to claim 15, wherein the generating of the plurality of initial states comprises verification initial states used for verification of the first hardware design model.

17. The computerized system according to claim 15, wherein the mappings comprise at least one mapping of a counter-example of initial states between the first hardware design model and the second hardware design model.

18. The computerized system according to claim 15, wherein the executed actions further comprise receiving at least one manual mapping, set by a manual operation of a user, wherein each one of the at least one manual mapping is a mapping between the first hardware design model and the second hardware design model.

19. The computerized system according to claim 18, wherein the at least one manual mapping was determined by an additional verification test result for the second hardware design.

* * * * *